United States Patent
Bezzateev et al.

(10) Patent No.: US 11,271,715 B2
(45) Date of Patent: Mar. 8, 2022

(54) CRYPTOGRAPHIC SYSTEM AND METHOD

(71) Applicant: 01 Communique Laboratory Inc., Mississuago (CA)

(72) Inventors: Sergey Bezzateev, Saint Petersburg (RU); Sergey Strakhov, Mississauga (CA); Andrew Cheung, Toronto (CA)

(73) Assignee: 01 Communique Laboratory Inc., Mississauga (CA)

( * ) Notice: Subject to any disclaimer, the term of this patent is extended or adjusted under 35 U.S.C. 154(b) by 0 days.

(21) Appl. No.: 16/268,098

(22) PCT Filed: Dec. 21, 2018

(86) PCT No.: PCT/RU2018/000847
§ 371 (c)(1),
(2) Date: Feb. 5, 2019

(87) PCT Pub. No.: WO2020/130869
PCT Pub. Date: Jun. 25, 2020

(65) Prior Publication Data
US 2021/0344476 A1    Nov. 4, 2021

(51) Int. Cl.
*H04L 29/06* (2006.01)
*H04L 9/00* (2022.01)
*G06F 21/60* (2013.01)
*H04L 9/30* (2006.01)
*H04L 9/32* (2006.01)

(52) U.S. Cl.
CPC ............ *H04L 9/002* (2013.01); *G06F 21/602* (2013.01); *H04L 9/3026* (2013.01); *H04L 9/3247* (2013.01); *H04L 9/304* (2013.01)

(58) Field of Classification Search
None
See application file for complete search history.

(56) References Cited

U.S. PATENT DOCUMENTS

| | | |
|---|---|---|
| 5,054,066 A | 10/1991 | Riek et al. |
| 7,551,740 B2 | 6/2009 | Lee et al. |
| 8,891,763 B2 | 11/2014 | Tomlinson et al. |
| 2003/0196080 A1 | 10/2003 | Karman |
| 2013/0013931 A1 | 1/2013 | O'Hare et al. |
| 2013/0094649 A1* | 4/2013 | Tomlinson ............ H04L 9/3026 380/30 |
| 2014/0052989 A1 | 2/2014 | Jones et al. |
| 2014/0105403 A1* | 4/2014 | Baldi ...................... H04L 9/304 380/282 |
| 2015/0163060 A1* | 6/2015 | Tomlinson ............... G09C 1/00 380/30 |
| 2017/0104590 A1 | 4/2017 | Wang |
| 2017/0279600 A1* | 9/2017 | Georgieva ............. H04L 9/003 |

(Continued)

OTHER PUBLICATIONS

International Search Report and Written Opinion issued in PCT/RU2018/000847, dated Sep. 12, 2019.

(Continued)

*Primary Examiner* — Maung T Lwin
(74) *Attorney, Agent, or Firm* — BakerHostetler

(57) ABSTRACT

A system and method for encryption of data. The system and method utilizes a cryptographic function that provides asymmetric encryption/decryption and digital signing capabilities that are hardened against cyber attack from quantum computers.

18 Claims, 7 Drawing Sheets

(56) References Cited

U.S. PATENT DOCUMENTS

| | | | |
|---|---|---|---|
| 2017/0324554 A1* | 11/2017 | Tomlinson | H04L 9/0618 |
| 2018/0054316 A1* | 2/2018 | Tomlinson | H04L 63/062 |
| 2018/0234256 A1 | 8/2018 | Bowen | |
| 2019/0089687 A1* | 3/2019 | Fiske | H04L 9/3066 |
| 2020/0127821 A1* | 4/2020 | Dolev | H04L 63/0823 |

OTHER PUBLICATIONS

Engelbert, et al., "A Summary of McEliece-Type Cryptosystems and their Security" Department of Computer Science, TU-Darmstadt, XP002449947, May 10, 2006, 54 pages.

Risse, et al., "Generating Goppa Codes" ICIT 2013 The 6th International Conference on Information Technology, XP055792106, May 8, 2013, 6 pages.

* cited by examiner

CRYPTOGRAPHIC SYSTEM AND METHOD

FIELD OF THE INVENTION

The present invention relates generally to cryptographic systems and methods. More particularly, the present invention relates to public key cryptographic systems and methods that can be used, for example, to build highly secure systems for data storage, access, encryption, decryption, digital signing, and digital signing verification.

BACKGROUND OF THE INVENTION

Security over the Internet is crucial as everyday life is becoming ever more reliant on the Internet, e.g. remote access, social media, banking, money transfer, stock trading, shopping, researching, medical records transfer, voting, tax filing, identification, etc. There are many aspects of security over the Internet, one of which is safe guarding accessibility of data by blocking unauthorized access to hardware components such as servers. Another aspect is to prevent comprehension of data after unauthorized access has occurred. This second aspect is critical in addressing the ever-evolving illegitimate and malicious means of gaining access to data. Many technologies have been developed to make the Internet safe against such illegitimate and malicious activities.

A common type of malicious activity is inserting spyware into an end-user computer to surreptitiously copy Internet activity such as User Name and Password transmission for various sensitive accounts. Anti-virus programs are one tool used to combat this type of attack. Another common malicious activity is spoofing a web site, such as a banks' online login page, to look the same as the original. When a user enters login credentials, this forged site captures the sensitive login credentials. Digital Certificates are a tool used to secure the Internet against this type of attack. Digital Certificates help to guarantee that the site you are visiting is really the site operated by the original intended organization instead of a "look-a-like" spoofed site operated by a malicious party. Digital Certificates also allow software publishers to digitally sign executable files to prove legitimacy.

Even though there are many ways to block malicious activities, there is an ever-present risk of becoming a victim of a cyber attack. For example, malicious attackers are constantly working on ways to bypass anti-virus software. Malicious parties may also be able to gain access to the database of a public server, such as a bank or a social media site, by-passing the login process. Malicious parties may also be able to tap into a communication session between an end user and a website they are accessing and collect data as a "man in the middle". It is important, therefore, to implement lower level security, such as encryption, to ensure that no one can understand the content of the communication session even if security has been breached.

There are many different encryption techniques. Symmetrical encryption methods, such as AES and DES, use the same key to encrypt and decrypt. Another form of encryption is the asymmetrical encryption method using a pair of private and public keys. Examples of this type of encryptions include RSA and El Gamal. This type of encryption uses one of the keys to encrypt data so that only the entity having the other key can decrypt it. Banks use this type of encryption in their communication sessions and typically employ an SSL Digital Certificate with a pair of private and public keys. The public key is built into the Certificate and distributed publicly to whoever wants to establish a communication session with the bank's server. When the user is communicating with the bank's server, such as when transmitting the user name and password, the contents will be encrypted and the corresponding session keys of the symmetric encryption will be encrypted using the public key. Only the bank's server, having the private key, will be able to decrypt the data.

In general, a public and private key pair is generated by multiplying two very large randomly selected prime numbers as well as performing some other complex mathematical processes such as hashing. Security of asymmetrical encryption lies in the difficulty of factoring a semi-prime number that is the product of two very large prime numbers, an essential step to reverse engineer a private key from its public key twin. As a result, the time required to factor a semi-prime number into the original prime numbers in order to decrypt the message ("Brute Force Time") is exponentially related to the size of the public key.

An RSA key size of 4096 bits is believed to be unbreakable in human acceptable time as of the date of this application using brute force factoring. However, this assumption only applies to computer technologies generally available as of the date of this application. A new breed of computer has been in development since early 1980s referred to as quantum computers. Quantum computers employ quantum-mechanical phenomena, such as superposition and entanglement, so that computation can be carried out simultaneously as contrasted with classical computing which is based on just on/off states, i.e., bits, and in which computation is performed sequentially.

A quantum computer is able to factor large numbers in polynomial time and could be used to break the public/private key mechanism. Shor's Algorithm, which is designed to run on a Quantum computer, is the process of period-finding which is done using Quantum Fourier Transform (QFT). The QFT can be used to determine the period of a function f(x). QFT processing can be done efficiently on a quantum computer because all of the experiments can be run at once in superposition, with bad experiments deteriorating from destructive interference effects and the good experiments dominating from constructive interference effects. Once the period-finding mechanism of the QFT becomes available, it can be exploited to find patterns in the mathematical structure of the number being factored. While not yet a commodity item, quantum computers will be at least available via the cloud in the foreseeable future.

Another trend is Distributed Ledger Technology ("DLT") which involves distributing a database over multiple computers as opposed to being contained in a single central database. This technology is also frequently referred to as "Blockchain" technology. DLT increases security by requiring each new block of data to be digitally signed by the authorized node who posted it, and to also include a hash value for the previous block. Thus, a list is formed that contains the hash values of all of the blocks in this chain going back to the first block. By requiring the hash values of all previous blocks to be included, the history of transactions is greatly secured against editing.

DLT further requires the chain of data blocks be replicated among numerous computers with a self-correcting mechanism. This way, not only is a natural redundancy built-in but, importantly, a consensus is also required to legitimize a new block. In other words, malicious activities must simultaneously attack a large number of nodes for the fake transaction to "appear as legitimate." Otherwise, the "minority fake transaction" will be over-written by the self-correcting mechanism of DLT.

DLT is considered to be a highly secure platform for cyber-security that is also practically feasible. Notwithstanding the advantages provided by DLT and asymmetric encryption, both technologies rely on the difficulty of prime number factorization as their main defense. Quantum computers, which have the ability to factor large prime numbers, will therefore present a challenge to security using these technologies.

A number of methods have been proposed that are theoretically capable of making the Brute Force Time exponentially related to the key size when quantum computers are used to do such computational processing. Examples of such methods are code-based encryption, lattice-based encryption, hash-based encryption, systems based on multivariate polynomial equations, and systems based on supersingular isogenies of elliptic curves. Exemplary code-based encryption functions include the McEliece cryptosystem and the Niederreiter cryptosystem which have been mathematically proven to have an exponential relation between key size and the Brute Force Time in the Post-Quantum world.

There are 2 main components of the secret key for the McEliece and Niederreiter schemes, i.e., a Goppa polynomial, $G(x)$, and L, i.e., the set of numerators of the codeword positions, also referred to as the locators or support set. From coding theory it is well-known that it is $G(x)$ and L that uniquely define the Goppa code, i.e., (L,G) code. $G(x)$ and L uniquely determine the parity check and generator matrices and they are also necessary to realize a constructive decoding algorithm of the (L, G) code. In all known schemes based on Goppa codes, the secret is a polynomial $G(x)$ where set L is a set of all elements of the Galois field $GF(2^m)$, where $2^m=n$ is an element of a public key.

With respect to the first component of the secret key, the known McEliece and Niederreiter encryption schemes are based on binary irreducible Goppa codes with the following 4 definitions:

Definition #1: Goppa code is called irreducible if $G(x)$ is an irreducible polynomial.

Definition #2: A binary vector $a=(a_1 a_2 \ldots a_n)$ is a codeword of (L, G) code if, and only if, the following equality is satisfied:

$$\sum_{i=1}^{n} \frac{a_i}{x - \alpha_i} = 0 \bmod G(x),$$

where $\alpha_i \in L$ and $L=\{\alpha_1, \alpha_2, \ldots, \alpha_n\} \subseteq GF(2^m), G(\alpha_i) \neq 0, \forall \alpha_i \in L$.

Definition #3: Goppa code is called separable if the polynomial $G(x)$ does not have multiple roots.

Definition #4: Goppa code is called wild if the polynomial $G(x)$ has the following form: $G(x)=g(x)^r$ where $g(x)$ is a separable polynomial.

With respect to the second component, the second part of the private key of McEliece and Niederreiter schemes is the support set $L \subseteq GF(2^m)$. In a classical McEliece scheme there are two matrices used: S, a random non-singular k×k matrix, and P, a random n×n permutation matrix. In the McEliece scheme, by using the two matrices and a generator matrix G, obtained from L and $G(x)$, a public key matrix $G^*=S \times G \times P$ is calculated.

The McEliece cryptosystem (MECS) is defined as follows:
Private key: (Decoding algorithm, L, $G(x)$, S, P)
Public key: $G^*=S \times G \times P$ Encryption: Let m be a k-bit message, and let e be a random n-bit vector with Hamming weight $W_H(e) \leq t$. Then $c=m \times G^* \oplus e$ is a ciphertext.

Decryption: Decryption is given by the following algorithm:
1) $c^*=c \times P^{-1}=m \times S \times G \oplus e \times P^{-1}=m^* \times G \oplus e \times P^{-1}$
2) Obtaining $m^*=m \times S$ by using decoding algorithm (error correcting) with knowledge L and $G(x)$.
3) $m=m^* \times S^{-1}$ Although a more secure form of encryption, the McEliece and Niederreiter schemes use a large key size, requiring more storage resources. There is a need for a cyber security mechanism that addresses the challenges to cyber-security that quantum computers will present. This mechanism must not only be secure against the computing power of quantum computers but it must also be deployable in connection with classical computing devices, smartphones, Internet-of-Things (IoT) devices, miniature devices like credit card chips, etc. This mechanism must also maintain high efficiency in the encryption/decryption process.

SUMMARY OF THE INVENTION

In accordance with one aspect of the present invention, a cryptographic system and cryptographic method is provided in which an input device receives data to be encrypted. The cryptographic system and method also includes a processor for receiving the data to be encrypted and encrypting that data using instructions from a cryptographic engine. In the cryptographic system and method, the instructions when executed encrypt the data using a code-based encryption scheme based on binary irreducible Goppa code in which the support set consists of the rational functions with a degree of the denominator not greater than the degree of the Goppa polynomial.

In accordance with another aspect of the invention, the instructions when executed also use the Goppa codes in a weighted Hamming metric.

In yet another aspect of the invention, the polynomials have degree not greater than r, where r is the maximum degree of the denominator of a rational function over $F_{2^m}[x]$ in the set of L, where L is a set of rational functions of degree not greater than r where r is greater than 1, and with coefficients from a finite field $GF(2^m)$.

In yet another aspect, a system and method is provided for creating a public key cryptographic platform that has increased security against cyber attacks using quantum computers. In this embodiment there are in general 3 different ways of implementation: 1) Signature-only; 2) Encryption-only; 3) Signature+Encryption. Signature-only implementation is utilized, for example, when authenticity of the message needs to be verifiable but the message can be transmitted and stored without encryption. An example of this is public Blockchain that is storing publicly-accessible data.

Encryption-only implementation is utilized, for example, when messages cannot be altered, corrupted, or replaced. An example is when the media is protected from tampering, but secrecy is required. This implementation is also suitable for cases such as, but not limited to, Tor, I2P, etc. when a sender remains anonymous so that the identity is unknown and therefore signature is not required. Another typical usage is hard drive encryption, folders/files encryption, database encryption, etc.

Signature+Encryption implementation is utilized, for example, when messages are first signed with the sender's private key, then encrypted with the receiver's public key before being transmitted to the receiver and finally decrypted by the receiver using the private key at the receiver. This kind of implementation can be found in most of the modern cryptographic frameworks and protocols such as, but not limited to, SSL, SSH, NPM, PGP/GPG, etc.

In accordance with another aspect of the present invention, a Trusted Platform Module (TPM) is provided for creating a public key cryptographic platform that has increased security against cyber attacks using quantum computers.

In accordance with another aspect of the present invention, an USB secure key is provided for creating a public key cryptographic platform that has increased security against cyber attacks using quantum computers.

In accordance with yet another aspect of the present invention, a Post-Quantum Blockchain ("PQBC") can be built to create a DLT that is safe in the post-quantum world of computing. This ensures sensitive data like financial transactions, privacy data, etc. can be trusted even in the post-quantum world of computing.

Aspects of the present invention can be applied to virtually any industry to increase security. Application to DLT is only one example of the applications. Optionally, encrypting data blocks in PQBC can further raise security.

There has thus been outlined, rather broadly, certain embodiments of an example of the invention in order that the detailed description thereof herein may be better understood, and in order that the present contribution to the art may be better appreciated. There are, of course, additional embodiments of an example of the invention that will be described below and which will form the subject matter of the claims appended hereto.

In this respect, before explaining at least one embodiment of an example of the invention in detail, it is to be understood that an example of the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
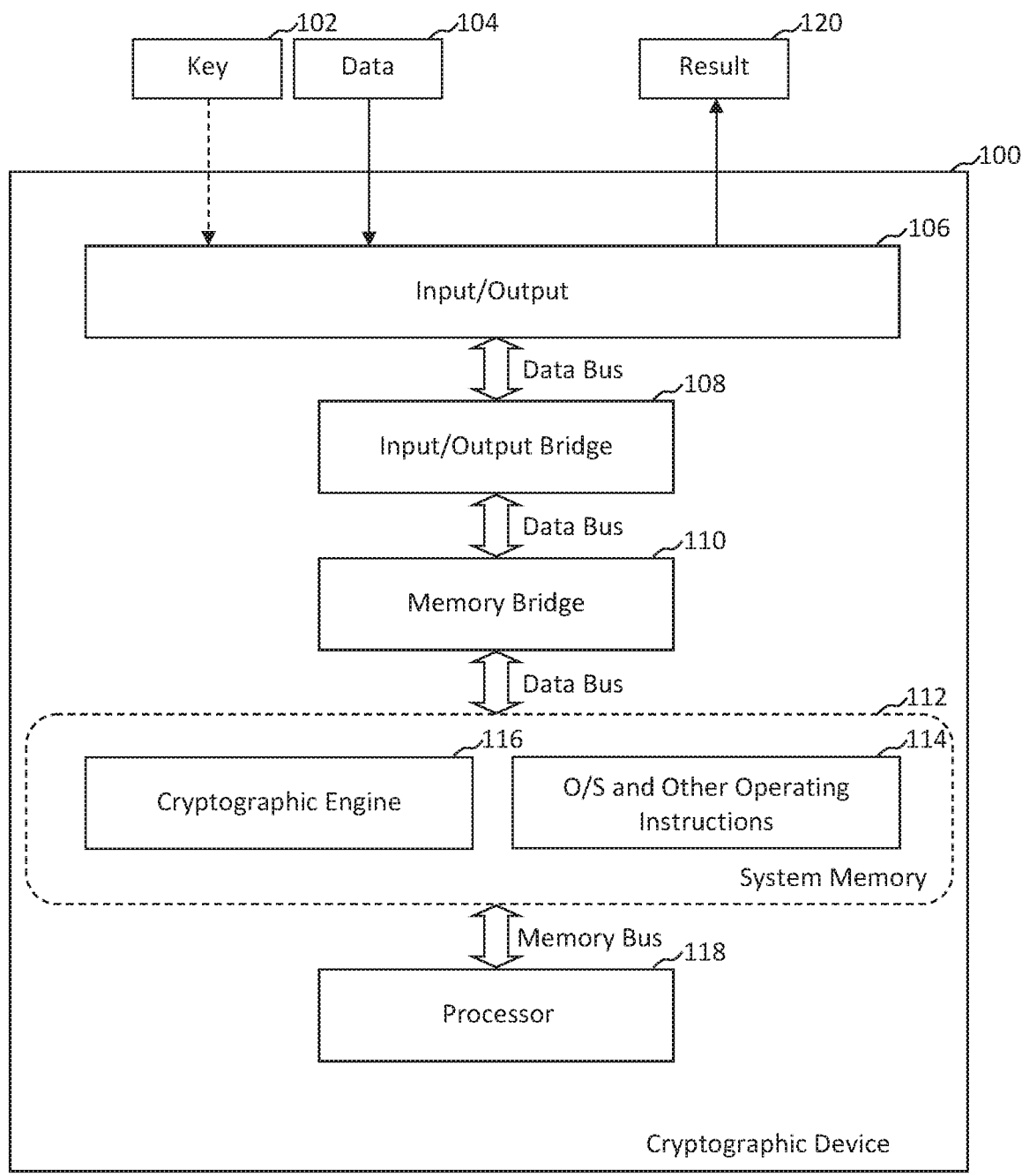
FIG. 1 is a block diagram of a system for carrying out a cryptographic method in accordance with one embodiment of the present invention whereby the system is used for encryption, decryption, generating digital signatures, verifying digital signatures, etc.

The invention will now be described with reference to the drawing figures in which like reference numerals refer to like parts throughout. In FIG. 1, a public key cryptographic device 100 in accordance with an exemplary embodiment of the invention is depicted. The cryptographic device 100 to receives an encryption key from memory 102, which can be a public key or private key. The cryptographic device also receives from an input device 104, data that is to be encrypted. The data can include, but is not limited to, a message vector to be securely transmitted from a sender to a receiver, or data from a network interface, a data storage device such as a hard drive, a key board, and the like. As described below, the data to be encrypted can also be the hash value of data to be digitally signed.

The encryption key and encrypted data may be received from inside a computing device, such as a personal computer, from one or more devices within a network or from third party devices outside the network. As described in more detail below, it will be readily understood that the public key cryptographic device can be any device capable of performing the processes described herein whether integrated into a single semiconductor package or distributed amongst several semiconductor devices contained within a single computer or server or distributed over multiple devices within one or more networks.

The cryptographic device 100 includes an input/output device 106, which can, for example, be a network communication interface, for receiving the plain data from the input device 104 and receiving the encryption key. The plain data and encryption key are then forwarded to an Input/Output Bridge 108 and a Memory Bridge 110 for storage in system memory 112. In exemplary embodiments the System Memory 112 may contain operating instructions such as, but not limited to, the Operating System 114. In addition to the operating system as well as other operating instructions 114 that are stored in system memory 112, the system memory includes the processing instructions of a cryptographic engine 116. The cryptographic engine 116 provides the operational instructions for the cryptographic functions such as encryption, decryption, digital signature, verification of digital signature, etc.

The cryptographic processing of the encrypted data is performed in the CPU 118 that is linked to system memory 112 via a Memory Bus. The CPU 118 can be implemented as a parallel co-processor, a field programmable gate array (FPGA), microprocessor, or the like, as is well understood.

Where all components of the system are contained within a single device, as depicted in FIG. 1, the cryptographic device 100 can be implemented as a single purpose computing device, e.g., a special device performing one or more special cryptography function like a secure key device, a credit card chip, passport chip, etc.) Alternatively, the components and functioning depicted in FIG. 1 can be can be distributed within a multiple purpose computing device, e.g., a general computer or server, or distributed over multiple devices within a network. For example, the functioning can be implemented on a cluster of server computers in a manner that is well-known.

The embodiment of FIG. 1 can be implemented on a computer network such as the Internet that is strengthened against cyber attack from both classical computers and quantum computers and has a manageable key size and improved computational efficiency using a variant of the McEliece and Niederreiter schemes. In the classical McEliece and Niederreiter algorithms, the scheme parameters are determined by two key elements m and t and the error correcting code is considered in the classical, i.e., un-weighted, Hamming metric. In one embodiment of the scheme of the present application there is significant flexibility in choosing the parameter of the code length n based on a third key parameter r and the use of Goppa codes in a weighted Hamming metric. In this embodiment, a special type of locator set, $L^*$, is used that is a set of rational functions of degree not greater than r where r is greater than 1, and with coefficients from a finite field $GF(2^m)$. This is contrasted with the classical scheme, in which the elements of the field $GF(2^m)$ are used as the locator set. This change in the locator set significantly increases the length of the code, while the calculations remain in the field $GF(2^m)$.

In this embodiment, a special representation of the parity check matrix H, and the generator matrix G of the code, a special selection of the error vector, and/or a special selection of the codeword presentation by the additional field(s) inclusion are utilized. In an embodiment a parity check matrix H is generated for an n, k, d binary generalized (L, G) code wherein n, k, and d, are positive integers, n is a code length, k is a number of information symbols and d is a minimal distance $n \leq \sum_{i=1}^{r} I_{2^m}(i), k \geq n-tm$. Where $I_{2^m}(i)$ is a number of irreducible polynomials of degree i with coefficients from $GF(2^m)$. It is also possible to present transformation $A \times H \times P = H^*$ (or $S \times G \times P = G^*$) as a special permutation of the support set L. Therefore, matrix $G^*$ or $H^*$ can be obtained directly, without matrix S or A and P, from $L^*$ and $G(x)$, where $L^*$ is a special secret permutation of support set L. In such case we can interpret $L^*$ as a second part of a secret key. This embodiment of the invention can be applied to make changes in the main components of, including, but not limited to, the encryption and signature schemes.

In this embodiment, by using the $L^*$ support set directly instead of L with matrix S and P, we can obtain the following variant of McEliece scheme:
Private key: (Decoding algorithm, $L^*$, $G(x)$)
Public key: $G^*$ Encryption: Let m be a k-bit message, and let e be a random n-bit vector with Hamming weight $W_H(e) \leq t$. Then $c = m \times G^* \oplus e$ is a ciphertext.

Decryption: Obtaining m by using decoding algorithm (error correcting) with knowledge $L^*$ and G.

In the Niederreiter scheme, by using the two matrices and parity check matrix H, obtained from L and $G(x)$, a public key matrix $H^* = A \times H \times P$ is calculated. As with the McEliece scheme, by using the $L^*$ support set directly instead of L with matrix A and P, we can obtain the following variant of Niederreiter scheme:
Private key: (Decoding algorithm, $L^*$, $G(x)$)
Public key: $H^*$ Encryption: Let m be a message, with Hamming weight $W_H(e) \leq t$. Then $c = m \times H^{*T}$ is a ciphertext.

Decryption: Obtaining m by using decoding algorithm (error correcting) with knowledge $L^*$ and $G(x)$.

This implementation allows for: 1) the expansion of the selection of a support set, thereby expanding the available private keys; 2) use of rational functions of degree greater than one to keep the calculation in a finite field with a comparable code length. For example, for rational functions of degree 2 with coefficients from the field $GF(2^m)$, the code length is $n = 2^{2m-1} + 2^{m-1}$. The practical benefits of using rational functions with different degree are: 1) reducing the amount of CPU cycles needed in the encryption, decryption, and key generation processes; and 2) increasing the security for codes with the same parameters (n, k, d), as in classical Goppa codes.

The generalized (L, G) code of an embodiment of the present invention is characterized by a set L where the proper rational functions of $F_{2^m}[x]$ are chosen whose denominators are various irreducible polynomials from $F_{2^m}[x]$ with degree less than or equal r (r>1), and whose numerators are formal derivatives of the denominators.

In an embodiment of the invention, a special support set L is used as a second part of the private secret key in the McEliece and Niederreiter method. In this embodiment, we have the following additional definitions:

Definition #5: Support set L is defined as follows:

$$L = \left\{ \frac{f_1'(x)}{f_1(x)}, \frac{f_2'(x)}{f_2(x)}, \ldots, \frac{f_n'(x)}{f_n(x)} \right\},$$

where $f_i'(x)$ is a formal derivative of $f_i(x)$ in $GF(2^m)$ and $f_i(x) = x^{l_i} + c_{l_i-1,i} x^{l_i-1} + \ldots c_{1,i} x + c_{0,i}$, $c_{j,i} \in GF(2^m)$, $\gcd(f_i(x), f_j(x)) = 1$, $\gcd(f_i(x), G(x)) = 1$, $\forall i, j, i \neq j$, $\deg G(x) = t$.

Definition #6: Binary vector $a = (a_1, a_2, \ldots, a_n)$ is a codeword of generalized (L, G) code if and only if the following equality is satisfied: $\sum_{i=1}^{n}$ $$a_i \frac{f_i'(x)}{f_i(x)} = 0 \mod G(x)$$

For such codes the design bound for the minimum distance:

$$d_G \geq \frac{2t+1}{l}, l$$

=max $l_i$ and the decoding algorithm corresponding to it is determined. To construct a parity check matrix for such generalized (L, G) code the following presentation for rational functions $$\frac{f_i'(x)}{f_i(x)}$$

by modulo G(x) is used:

$$\frac{f_i'(x)}{f_i(x)} = s_i(x) = b_{i,t-1}x^{t-1} + b_{i,t-2}x^{t-2} + \cdots + b_{i,1}x^1 + b_{i,0} \mod G(x),$$
$$b_{i,j} \in GF(2^m)$$

The equation for the generalized Goppa code can then be rewritten as:

$$\sum_{i=1}^{n} a_i \frac{f_i'(x)}{f_i(x)} = \sum_{i=1}^{n} a_i \, s_i(x)$$
$$= \sum_{i=1}^{n} a_i \, b_{i,t-1}x^{t-1} + \sum_{i=1}^{n} a_i \, b_{i,t-2}x^{t-2} + \cdots +$$
$$\sum_{i=1}^{n} a_i \, b_{i,1}x^1 + \sum_{i=1}^{n} a_i \, b_{i,0}$$
$$= 0 \mod G(X),$$

From this equation a parity check matrix H is obtained:

$$H = \begin{bmatrix} b_{1,t-1} & b_{2,t-1} & \cdots & b_{n,t-1} \\ \vdots & \vdots & \ddots & \vdots \\ b_{1,0} & b_{2,0} & \cdots & b_{n,0} \end{bmatrix}$$

From this parity check matrix we can obtain a generator matrix G for the generalized (L, G) code and by using matrix S and P to calculate the public key matrix $G^* = S \times G \times P$.

In another embodiment we can also use the fractions $$\frac{f_i'(x)}{f_i(x)}$$

with different degrees of $f_i(x)$ for support set L. By using irreducible polynomials $f(x)$ with degree not greater than r for support set we can obtain a generalized Goppa code with codeword length $n \leq \sum_{i=1}^{r} I_{2^m}(i)$, where $I_{2^m}(i)$ is a number of irreducible polynomials of degree i with coefficients from $GF(2^m)$.

The following two examples are provided for illustration purposes:

Example 1: In this example m=6 and r=2. Since $$I_{2^6}(1) = 64, \, I_{2^6}(2) = \frac{2^{12} - 2^6}{2}$$

we obtain n=2048+32=2080. Let d=61, t=30 then we have k≥2080−60·6=1720.

Example 2: For l=2 and $f_i(x) = (x-\beta_i)(x-\beta_i^{2^m})$, $\beta_i \in GF(2^{2m}) \setminus GF(2^m)$, G(x) which is an irreducible polynomial from the polynomial ring $F_{2^m}[x]$. The parity check matrix for this example is:

$$\frac{1}{x-\beta} = \frac{G(x) - G(\beta)}{x-\beta} G(\beta)^{-1} \mod G(x)$$

and $$\frac{\beta + \beta^{2^m}}{(x-\beta)(x-\beta^{2^m})} =$$
$$G(x)\frac{-G(\beta)}{x-\beta}G(\beta)^{-1} + \frac{G(x) - G(\beta^{2^m})}{x-\beta^{2^m}}G(\beta^{2^m})^{-1} \mod G(x)$$

$$\frac{G(x) - G(\beta)}{x-\beta} = g_t(x^{t-1} + x^{t-2}\beta + \cdots + \beta^{t-1}) +$$
$$g_{t-1}(x^{t-2} + x^{t-3}\beta + \cdots + \beta^{t-2}) + \cdots g_2(x+\beta) + g_1,$$

where $G(x) = \sum_{i=0}^{t} g_i \, x^i$, $g_i \in GF(2^m)$, $g_t \neq 0$, $g_0 \neq 0$ and $$\frac{G(x) - G(\beta^{2^m})}{x-\beta^{2^m}} = g_t\left(x^{t-1} + x^{t-2}\beta^{2^m} + \cdots + \beta^{2^m(t-1)}\right) +$$
$$g_{t-1}\left(x^{t-2} + x^{t-3}\beta^{2^m} + \cdots + \beta^{2^m(t-2)}\right) + \cdots g_2\left(x + \beta^{2^m}\right) + g_1,$$

The coefficients at $x^{t-1}, x^{t-2}, \ldots, x, 1$ in the sum $$\frac{G(x) - G(\beta)}{x-\beta}G(\beta)^{-1} + \frac{G(x) - G(\beta^{2^m})}{x-\beta^{2^m}}G(\beta^{2^m})^{-1}$$

$$x^{t-1}: \left(G(\beta)^{-1} + G(\beta^{2^m})^{-1}\right), g_t,$$
$$x^{t-2}: \left(G(\beta)^{-1} + G(\beta^{2^m})^{-1}\right)g_{t-1} + \left(\beta G(\beta)^{-1} + \beta^{2^m} G(\beta^{2^m})^{-1}\right)g_t.$$
$$x^{t-3}: \left(G(\beta)^{-1} + G(\beta^{2^m})^{-1}\right)g_{t-2} +$$
$$\left(\beta G(\beta)^{-1} + \beta^{2^m} G(\beta^{2^m})^{-1}\right)g_{t-1} + \left(\beta^2 G(\beta)^{-1} + \beta^{2 \cdot 2^m} G(\beta^{2^m})^{-1}\right)g_t,$$
$$x^0: \left(G(\beta)^{-1} + G(\beta^{2^m})^{-1}\right)g_1 + \left(\beta G(\beta)^{-1} + \beta^{2^m} G(\beta^{2^m})^{-1}\right)g_2 +$$
$$\cdots + \left(\beta^{t-1} G(\beta)^{-1} + \beta^{(t-1)2^m} G(\beta^{2^m})^{-1}\right)g_t.$$

A parity check matrix H is defined by:

$$H = \begin{bmatrix} G(\beta_1)^{-1} + G(\beta_1^{2^m})^{-1} & G(\beta_2)^{-1} + G(\beta_2^{2^m})^{-1} & G(\beta_n)^{-1} + G(\beta_n^{2^m})^{-1} \\ \beta_1 G(\beta_1)^{-1} + \beta_1^{2^m} G(\beta_1^{2^m})^{-1} & \beta_2 G(\beta_2)^{-1} + \beta_2^{2^m} G(\beta_2^{2^m})^{-1} & \beta_n G(\beta_n)^{-1} + \beta_n^{2^m} G(\beta_n^{2^m})^{-1} \\ & \vdots & \\ \beta_1^{t-1} G(\beta_1)^{-1} + \beta_1^{(t-1)2^m} G(\beta_1^{2^m})^{-1} & \beta_2^{t-1} G(\beta_2)^{-1} + \beta_2^{(t-1)2^m} G(\beta_2^{2^m})^{-1} & \beta_n^{t-1} G(\beta_n)^{-1} + \beta_n^{(t-1)2^m} G(\beta_n^{2^m})^{-1} \end{bmatrix}$$

By way of the foregoing, a special generalization of Goppa codes is constructed with a support set L as a set of rational functions $$\frac{f_i'(x)}{f_i(x)}.$$

The special generalization of Goppa codes is neither a Reed Solomon (RS) code nor an alternant code.

For decoding these generalized Goppa codes, the Goppa polynomial G(x) and support set L must be known. A classical decoding algorithm (Euclidean, Berlekamp-Massey, Patterson, etc.) can then be used.

Using a set of position numerators of degree greater than 1, the degree of Galois field extension m for obtaining a support set L is reduced, thereby reducing the complexity of the calculations in the decoding process. The degree m of the field extension is reduced by r times, where r is the degree of the position numerators.

By way of example, a scheme (2060, 1720, t=30) can be constructed close in parameters to the classical McEliece and Niederreiter (2048, 1718, t=30) scheme by using elements from the Galois field $GF(2^6)$ instead of the field $GF(2^{11})$ used in the original scheme. Therefore in the scheme of this example, all calculations in the decoding procedure can be done in the Galois field $GF(2^6)$ with only $2^6$ elements instead of the Galois field $GF(2^{11})$ with $2^{11}$ elements required.

In the embodiment depicted in FIG. 1, after the cryptographic operations are performed, the result 120 of this computation is returned to the input/output device 106 and output from the cryptographic device 100. An embodiment in accordance with one aspect of the present invention provides a public key cryptographic system and method that can be used to build a highly secure system for data storage, access, encryption, decryption, digital signing, digital signature verification, etc.

Figure 2:
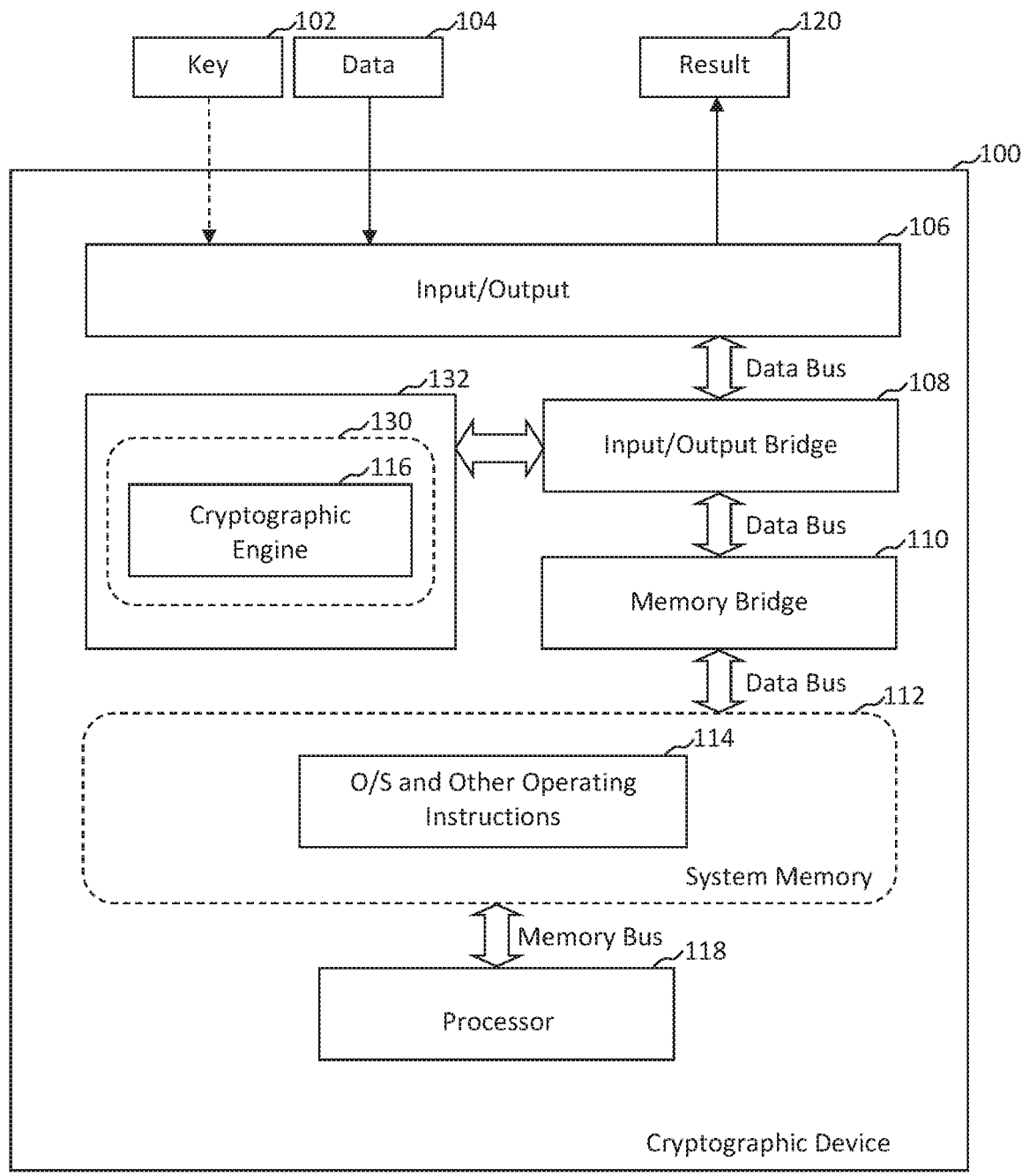
FIG. 2 is a block diagram of a system for carrying out a cryptographic method in accordance with an additional embodiment of the present invention whereby the system provides further security through use of a trusted platform module (TPM) or a universal serial bus (USB) interface.

FIG. 2 depicts an alternative embodiment of a system in which the foregoing encryption method can be employed. In the system of FIG. 2, the cryptographic engine 116 is implemented on a Chip 130, such as field programmable gate array (FPGA), operating as an independent processing module 132 such as, but not limited to, a TPM-Trusted Platform Module (TPM) or a Universal Serial Bus (USB) Module, rather than being stored in system memory. An advantage of implementing the cryptographic engine 116 on an independent processing module 132 is that the private key 124 is stored on the chip 130 and therefore separated from the operating system contained in the System Memory 114. This provides an added layer of security as the Private Key 124 is not directly exposed to the file system of the operating system which can be compromised as can the system memory 114.

Figure 3:
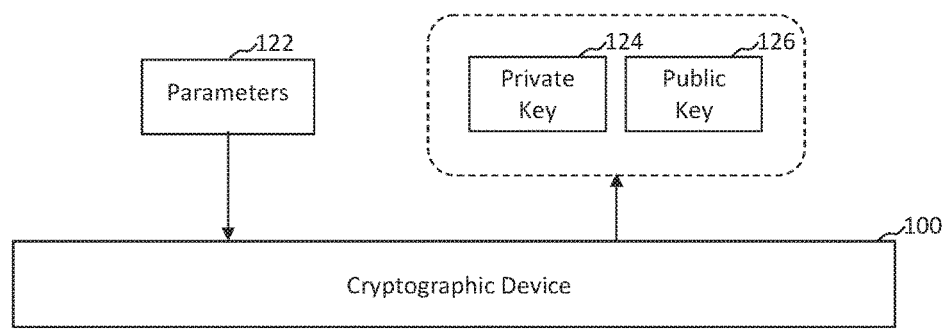
FIG. 3 is a block diagram of a system for carrying out a cryptographic method in accordance with another embodiment of the invention whereby the system generates a public key and a private key based on a set of input parameters.

In the alternative embodiment of FIG. 3, the public key cryptographic device 100 generates a private key 124 and its corresponding public key 126 using an input list of parameters 122. As previously described, the public key 126 (FIG. 3) can be used in encryption and decryption operations. In one embodiment, the public key cryptographic device 100 of FIG. 3 can be implemented as described in connection with FIG. 1 except for the instructions being implemented by the cryptographic engine 116.

Figure 4:
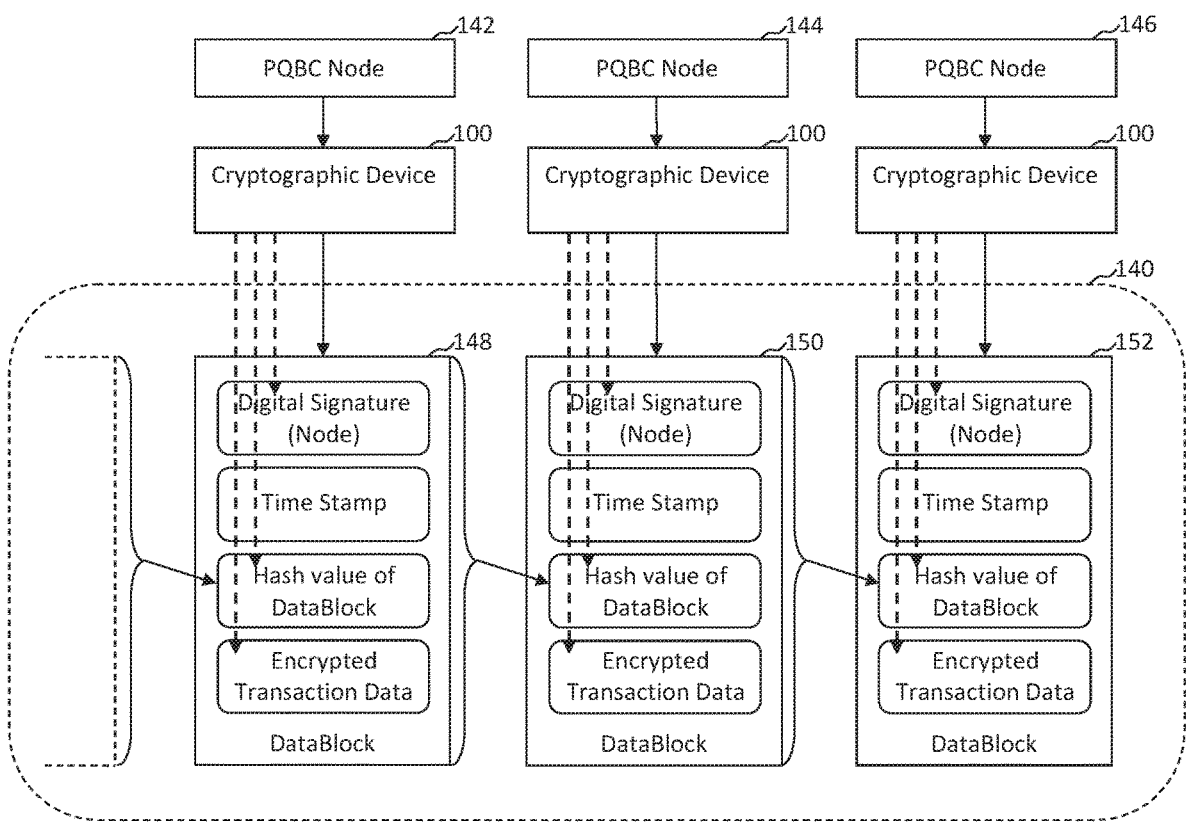
FIG. 4 is a block diagram of a system for carrying out a cryptographic method in accordance with another embodiment of the invention whereby a Post-Quantum Blockchain (PQBC) is created so that data security of the PQBC is strengthened against cyber attacks from quantum computers and classical computers.

An application of the foregoing systems is depicted in FIG. 4, in which the cryptographic engine can be applied to create a Post-Quantum Blockchain (PQBC) 140. In the exemplary embodiment of FIG. 4, the last data block 152 in the PQBC 140 is created by participant node 146 preceded by the data block 150 created by participant node 144 and further preceded by the data block 148 created by participant node 142. All participant nodes use a public key cryptographic device 100 for cryptographic functions. For example, when node 146 creates the last data block 152, node 146 digitally signs the block and records the hash value of the previous data block 150 in the PQBC using a digital signature function in the public key cryptographic device 100. Similarly the other participant nodes 142 and 144 perform the same steps when creating a new data block. Transaction data inside each of the data blocks can optionally be encrypted using the encryption function in the public key cryptographic device 100. End point security can be further enhanced by employing the system of FIG. 3 in which the private key 124 is maintained separate from the operating system.

Figure 5:
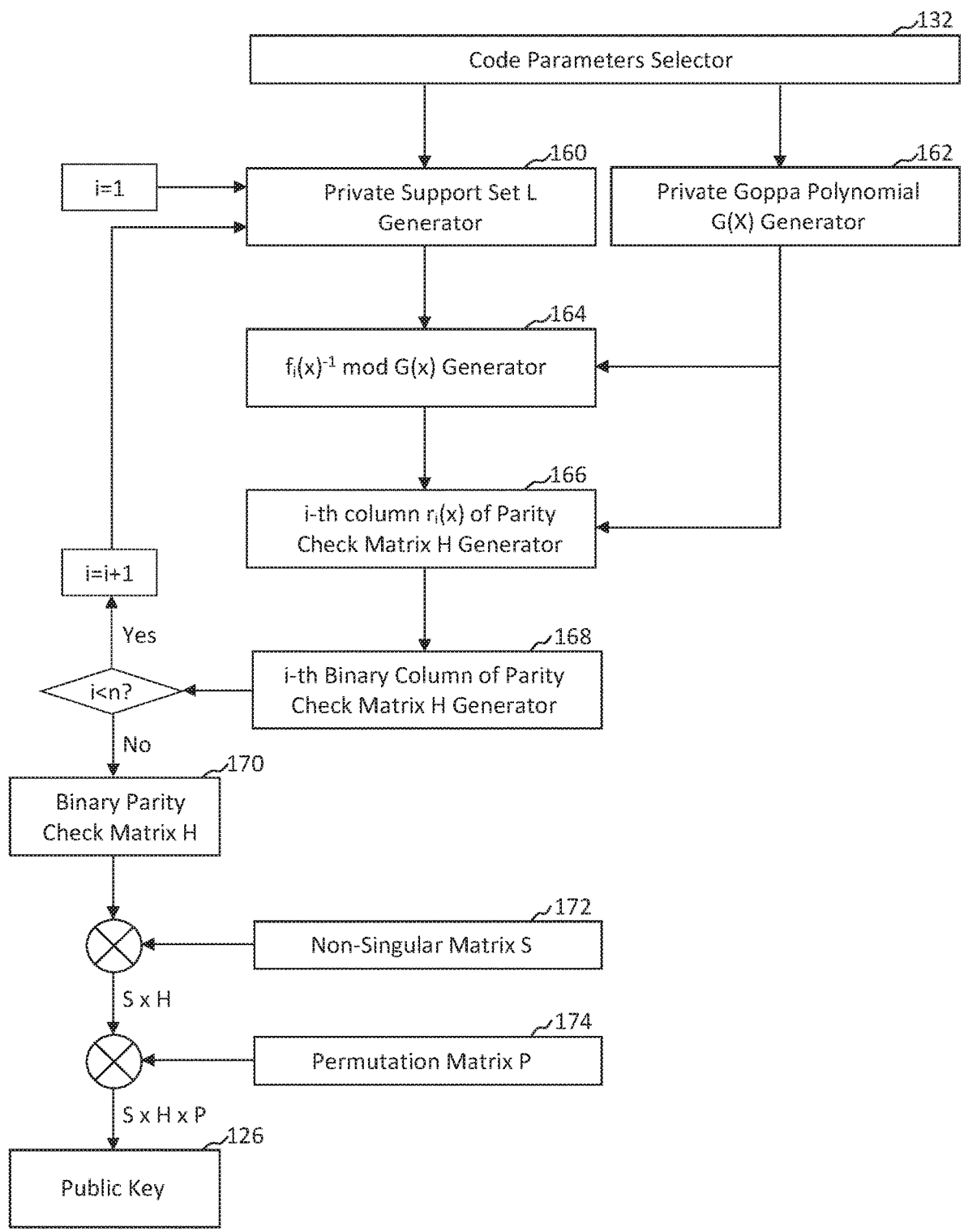
FIG. 5 is a flowchart illustrating a process of generating a private key and a corresponding public key in a public key cryptographic device in accordance with an embodiment of the present invention.

Alternative instructions that can be implemented by the device of FIG. 3 are depicted in connection with FIG. 5 in which a method of generating a private and public key pair is shown. The private key 124 and its corresponding public key 126 are used for different functions in the public key cryptographic device 100 such as, but not limited to, encryption, decryption, digital signing, and digital signature verification. The code parameter selection engine 132 chooses m, r, t, n with the property that code length $n \leq \Sigma_{i=1}^r I_{2^m}(i)$, $t>r$ and wherein: m is the degree of the field expansion $GF(2^m)$ in which the operations will be performed during decoding and signature calculations, and which will thereby determine the complexity of the circuit calculations; r is the maximum degree of the denominator of a rational function over $F_{2^m}[x]$ in the set of L; and t is the number of errors in the weighted Hamming metric that can be corrected by the code. There is no limit on how m, r, and t are selected.

For illustration purposes, m determines the Galois field $GF(2^m)$ used in the calculations while r and m determine the size of support set L. Since code length n, r, and t determine a minimal distance of the code, therefore these parameters also determine the number of errors that could be corrected by such error correcting code. The private support set L generator 160 chooses or generates n elements (rational functions $$\frac{f_i'(x)}{f_i(x)})$$

to support set L. For the sake of clarity, $f_i(x)$ should be an irreducible polynomial of degree r. There are well-known methods to generate such polynomial, which are outside the scope of this invention. The Private Goppa Polynomial G(x) processor 162 chooses and/or generates primitive polynomial degree t from $F_{2^m}[x]$. For the sake of clarity, G(x) is an irreducible (separable) polynomial of degree t with coefficients from $GF(2^m)$. There are well-known methods to generate such polynomial, any of which can be used. The two elements G and L of Goppa code are defined unequally. Therefore, by using the $(f_i(x))^{-1}$ mod G(x) generator 164 and obtaining $r_i(x)$ using the i-th column $r_i(x)$ of parity check matrix H generator 166, it is now possible to use the i-th binary column of parity check matrix H generator 168 to obtain a number of binary elements equal to the multiplication of t and m (tm), and collect all necessary n columns and tm binary rows $r_{i1}, r_{i2}, \ldots, r_{imt}$ of parity check matrix H from the i-th column $r_i(x) \in GF(2^m)$, deg $r_i(x) = t-1$ during n cycles of the process of steps 160, 164, and 166. For the sake of clarity, $r_i(x)=f'_i(x) f_i(x))^{-1}$ mod $G(x)$, where $f'_i(x)$ is formal derivative of $f_i(x)$. The binary parity check matrix H 170 is represented as a tm×n binary matrix. Together with a randomly selected mt×mt non-singular matrix S 172 and another randomly selected n×n permutation matrix P 174 the public key 126 can be obtained by performing a matrix multiplication of $H^*=S\times H\times P$. On the other hand, the private key 124 can be obtained as K={S, P, L, G(x)}.

Figure 6:
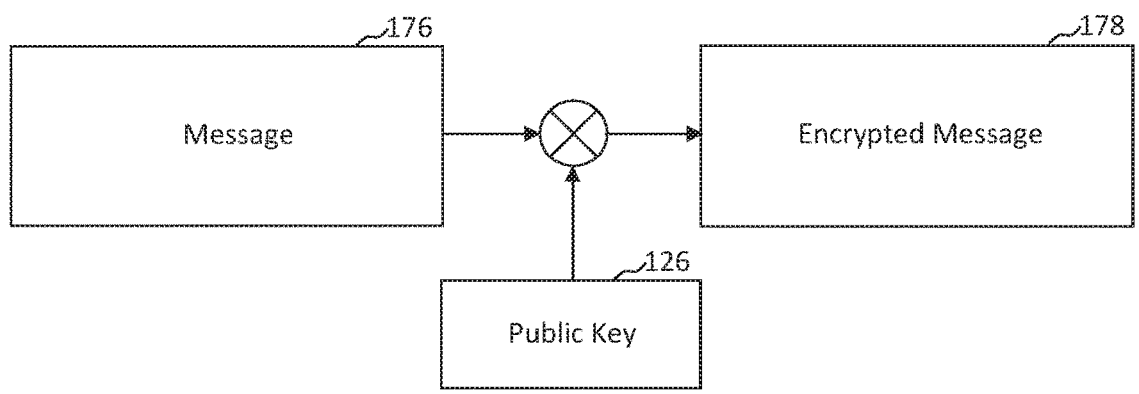
FIG. 6 is a flowchart illustrating the process of encrypting data using a public key in the public key cryptographic device in accordance with an embodiment of the present invention.

A method of encrypting a message in accordance with an embodiment of the present invention is depicted in FIG. 6 in which the Message 176 is presented as a binary vector e of length n and Hamming weight no more than t/r. The Encrypted Message 178 is obtained as an encrypted vector w of length mt by using matrix multiplication of the public key 126 and the message 176 whereby $w=e\times(H^*)^T$.

Figure 7:
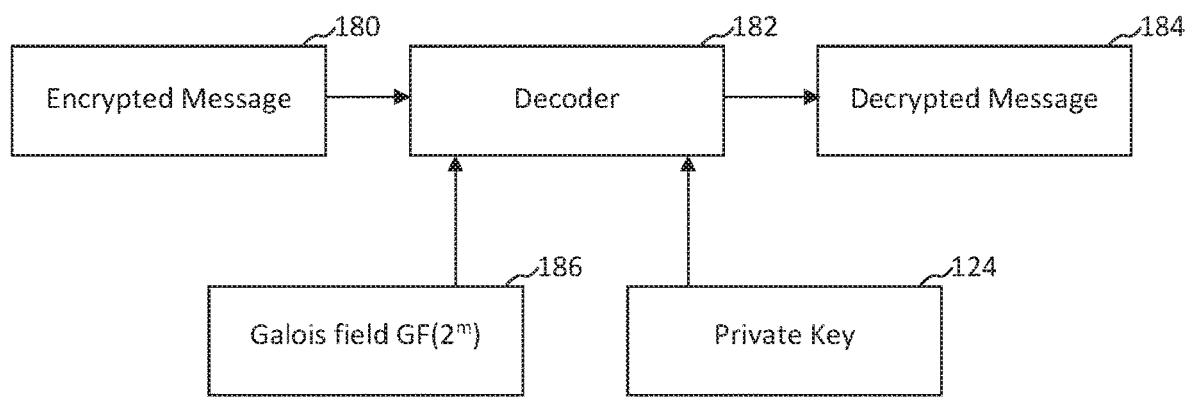
FIG. 7 is a flowchart illustrating the process of decrypting an encrypted data using a corresponding private key in a public key cryptographic device in accordance with an embodiment of the present invention.

A method of decrypting an encrypted message in accordance with a preferred embodiment of the invention is depicted in FIG. 7 in which the encrypted message 180 of length mt is decoded by decoder 182 using a Berlekamp-Massey algorithm or an extended Euclidean algorithm or Patterson algorithm. The private key 124 and the elements of field $GF(2^m)$ 186 are provided to the decoder 182 for the decoding process. For the sake of clarification, in the private key 124 G(x) is an irreducible polynomial of degree t with coefficients from the field $GF(2^m)$ with support set L as a set of rational functions $$\frac{f'_i(x)}{f_i(x)}.$$

The decoded message 184 is an information vector e of the length n and weight in the weighted Hamming metric less than or equal to t.

Figure 8:
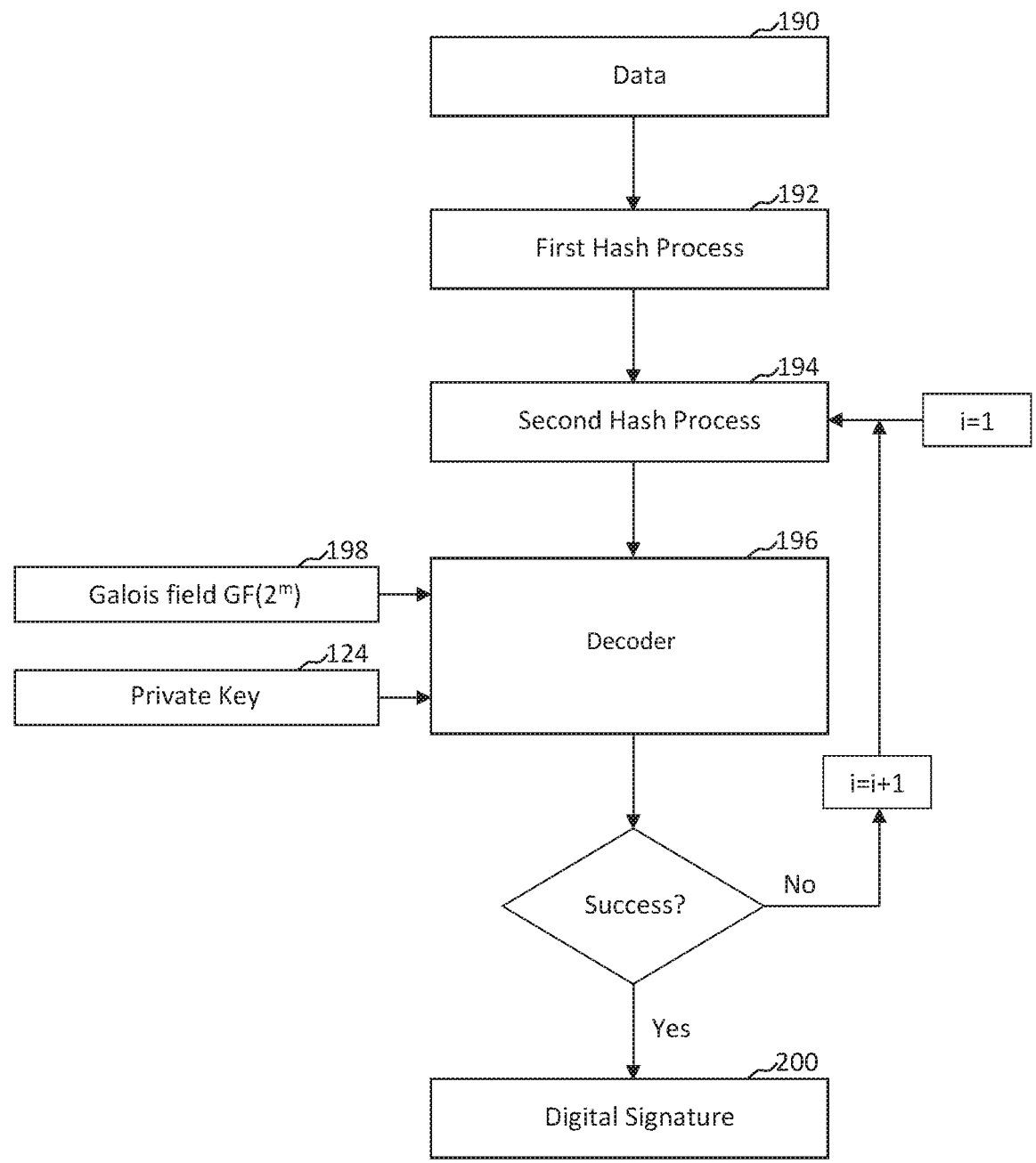
FIG. 8 is a flowchart illustrating the process of digital signing data using a private key in a public key cryptographic device in accordance with an embodiment of the present invention.

A method of obtaining a digital signature for input data, using the cryptographic device 100, is depicted in FIG. 8. This method uses the secret Goppa code elements of a Goppa polynomial G(x) with support set L in a well-known digital signature generation process such as, but not limited to, the Courtois-Finiasz-Sendrier (CFS) signature scheme. Data 190 to be digitally signed is provided to a first hash process 192. The resulting hash value h is used by a second hash process 194 to generate hash value H using h and i (H=hash(h∥i) where the length of H is mt bits) where i is a looping incremental value starting at 1. The second hash value H is then used by the decoder 196 in a decoding process based on elements of a Galois field $GF(2^m)$ 198 and a private key 124 using an Berlekamp-Massey or Extended Euclidean algorithm. For the sake of clarification, in the private key 124, G(x) is an irreducible polynomial of degree t with coefficients from the field $GF(2^m)$) with support set L as a set of rational functions $$\frac{f'_i(x)}{f_i(x)}.$$

The second hash process 194 and the decoder 196 are repeated with an incrementing i value until a successful decoding is reached. The resulting digital signature 120, represented as {s,i}, consists of two elements: 1) a vector s of the length n and weight in the weighted Hamming metric of less than or equal to t; and 2) a parameter i equal to the number of the successful steps.

Figure 9:
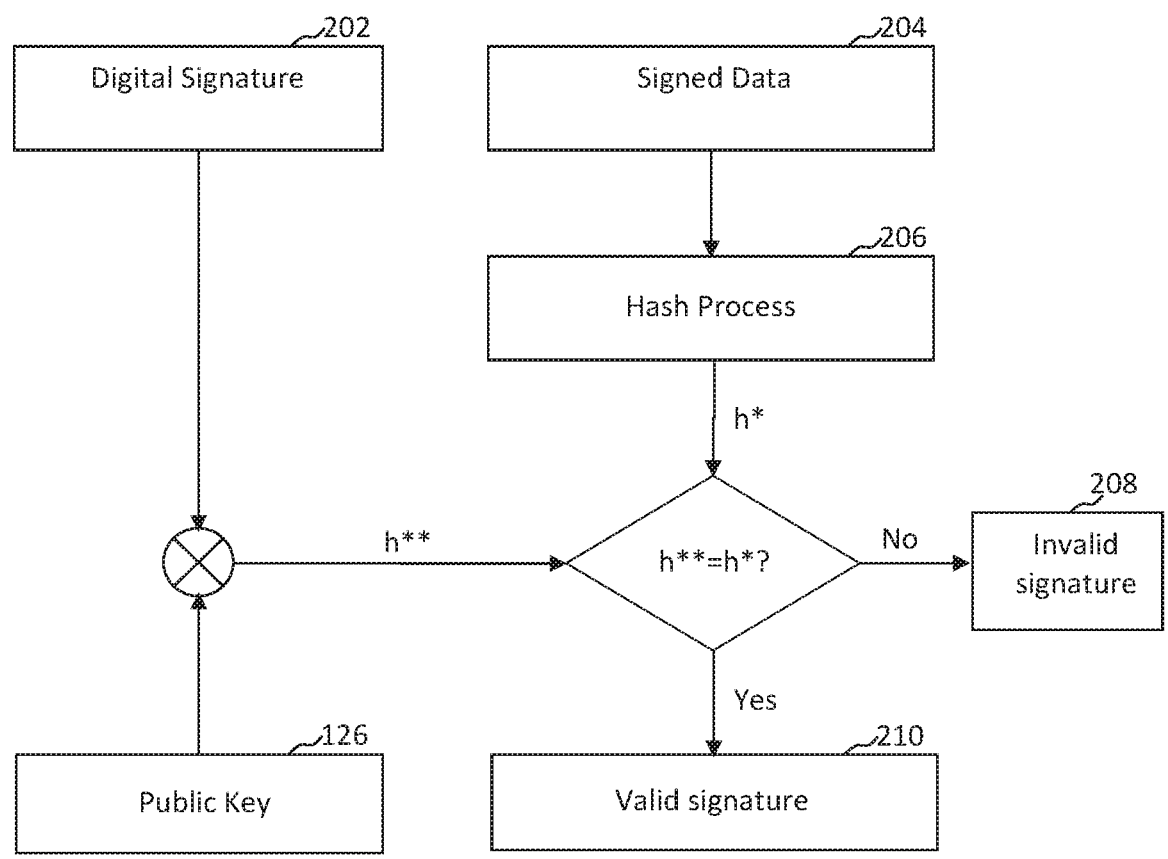
FIG. 9 is a flowchart illustrating the process of verifying a digital signature using a corresponding public key in a public key cryptographic device in accordance with an embodiment of the present invention.

A method of verifying a digital signature for given data, in the cryptographic device 100, is depicted in FIG. 9. In this embodiment, the digital signature 202 to be verified is represented as {s*,i}. The data 204, which is signed by the digital signature 202, is provided to a hash process 206 as w. Hash process 206 is operated so that the resulting hash value h*=Hash(h∥i), where Hash(w)=h and i is the parameter in the digital signature 202. From the digital signature 202 we can obtain the signature vector s* of length n and weight less than or equal to t in the weighted Hamming metric. A binary vector h of the length tm, $h^{}=s^*\times(H^*)^T$, can be obtained by using matrix multiplication of the public key 126 and the binary vector of the signature s from digital signature 202. The determination between valid signature 208 and an invalid signature 210 can be obtained by comparing the value h** and h*.

Although specific embodiments of the invention have been set forth herein, it is not intended that those be limiting. It should be understood that alternate embodiments, including variations and modifications thereto as well as various other features or functions, can be added to the present invention without departing from the scope of the present invention.

What is claimed is:

1. A cryptographic system, comprising:
an input device configured to receive data to be at least one of encrypted, decrypted, signed, and verified; and
a processor configured to receive the data and to at least one of encrypt, decrypt, sign, and verify the data using instructions from a cryptographic engine;
wherein the instructions, when executed, cause performance of at least one of the encryption, the decryption, the signature, and the verification using a code-based scheme based on a binary irreducible Goppa code in which a support set comprises a rational function having a denominator with a degree that is not greater than a degree of a Goppa polynomial of the Goppa code, and
wherein the performance causes resulting data to be protected against an attack from a quantum computer,
wherein the instructions when executed further generate a private key satisfying the relationship K={S, P, L, G(x)},
wherein a parity check matrix H is generated for binary generalized Goppa code with Goppa polynomial G(x) of degree equal to t, where G(x) is an irreducible polynomial with coefficients from a Galois field $GF(2^m)$,
wherein locator polynomials for support set L of binary generalized (L, G) code are generated as irreducible polynomials with coefficients from the field $GF(2^m)$ having a degree not greater than r,
wherein a vector length set N={$n_1, n_2, \ldots, n_r$} of Goppa code is generated, where $n_i=I_2m(i)$, i=1, . . . , r, and $n=\Sigma_{i=1}^{r} n_i$, where $I_2m(i)$ is a number of irreducible polynomials of degree i with coefficients from the field $GF(2^m)$,
wherein a vector position weight set W={$w_1, w_2, \ldots, w_r$} is generated, where the first $n_1$ positions have weight $w_1=1$, the second $n_2$ positions have weight $w_2=2$, and the last $n_r$ positions have weight $w_r=r$,
wherein a random mt×mt non-singular matrix S is selected, where deg G(x)=t;
wherein a random n×n permutation matrix P is selected; and
wherein a public key $H^*=S\times H\times P$ is computed.

2. The cryptographic system of claim 1, wherein the instructions when executed also use the Goppa code in a weighted Hamming metric.

3. The cryptographic system of claim 1, wherein the Goppa polynomial has the degree not less than r, where r is a maximum degree of a denominator of a rational function over $F_2m[x]$ in the set of L, where L is a set of rational functions of degree not greater than r, where r is greater than 1, and with coefficients from a finite field $GF(2^m)$.

4. The cryptographic system of claim 3, wherein the instructions when executed also uses the Goppa code in a weighted Hamming metric.

5. The cryptographic system of claim 4, wherein the code-based scheme is a generalized (L, G) code in which a set of proper rational functions (L) over $F_{2^m}[x]$ are chosen, wherein the denominators of L are various irreducible polynomials from $F_{2^m}[x]$ with degree less than or equal to r, where r is greater than 1, and where the numerators are formal derivatives of the denominators.

6. A cryptographic system, comprising:
an input device configured to receive data to be at least one of encrypted, decrypted, signed, and verified; and
a processor configured to receive the data and to at least one of encrypt, decrypt, sign, and verify the data using instructions from a cryptographic engine;
wherein the instructions, when executed, cause performance of at least one of the encryption, the decryption, the signature, and the verification using a code-based scheme based on a binary irreducible Goppa code in which locator polynomials for support set L of binary generalized (L, G) code are generated as irreducible polynomials with coefficients from a Galois field $GF(2^m)$ have a degree not greater than r, where r is the maximum degree of the denominator of a rational function over $F_2m[x]$, and
wherein the performance causes resulting data to be protected against an attack from a quantum computer,
wherein the instructions when executed further generate a private key satisfying the relationship K={S, P, L, G(x)},
wherein a parity check matrix H is generated for binary generalized Goppa code with Goppa polynomial G(x) of degree equal to t, where G(x) is an irreducible polynomial with coefficients from the field $GF(2^m)$,
wherein a vector length set N={$n_1, n_2, \ldots, n_r$} of Goppa code is generated, where $n_i = I_2m(i)$, i=1, ..., r, and $n = \Sigma_{i=1}^r n_i$, where $I_2m(i)$ is a number of irreducible polynomials of degree i with coefficients from the field $GF(2^m)$,
wherein a vector position weight set W={$w_1, w_2, \ldots, w_r$} is generated, where the first $n_1$ positions have weight $w_1=1$, the second $n_2$ positions have weight $w_2=2$, and the last $n_r$ positions have weight $w_r=r$,
wherein a random mt×mt non-singular matrix S is selected, where deg G(x)=t;
wherein a random n×n permutation matrix P is selected; and
wherein a public key H*=S×H×P is computed.

7. The cryptographic system of claim 6, wherein the instructions when executed also uses the Goppa code in a weighted Hamming metric.

8. A method, comprising:
receiving data at an input device; and
forwarding the data to a processor for at least one of encrypting, decrypting, signing, and verifying the data using instructions provided by a cryptographic engine;
wherein the instructions, when executed, cause performance of at least one of the encryption, the decryption, the signature, and the verification using a code-based scheme based on a binary irreducible Goppa code in which a support set comprises a rational function with a denominator having a degree that is not greater than the degree of a Goppa polynomial of the Goppa code, and
wherein the performance causes resulting data to be protected against an attack from a quantum computer,
wherein the instructions when executed further generate a private key satisfying the relationship K={S, P, L, G(x)},
wherein a parity check matrix H is generated for binary generalized Goppa code with Goppa polynomial G(x) of degree equal to t, where G(x) is an irreducible polynomial with coefficients from a Galois field $GF(2^m)$,
wherein locator polynomials for support set L of binary generalized (L, G) code are generated as irreducible polynomials with coefficients from the field $GF(2^m)$ having a degree not greater than r,
wherein a vector length set N={$n_1, n_2, \ldots, n_r$} of Goppa code is generated, where $n_i = I_2m(i)$, i=1, ..., r, and $n = \Sigma_{i=1}^r n_i$, where $I_2m(i)$ is a number of irreducible polynomials of degree i with coefficients from the field $GF(2^m)$,
wherein a vector position weight set W={$w_1, w_2, \ldots, w_r$} is generated, where the first $n_1$ positions have weight $w_1=1$, the second $n_2$ positions have weight $w_2=2$, and the last $n_r$ positions have weight $w_r=r$,
wherein a random mt×mt non-singular matrix S is selected, where deg G(x)=t;
wherein a random n×n permutation matrix P is selected; and
wherein a public key H*=S×H×P is computed.

9. The method of claim 8, wherein the instructions when executed also use the Goppa codes in a weighted Hamming metric.

10. The method of claim 8, wherein the polynomials have degree not greater than r, where r is the maximum degree of the denominator of a rational function over $F_2m[x]$ in the set of L, where L is a set of rational functions of degree not greater than r where r is greater than 1, and with coefficients from a finite field $GF(2^m)$.

11. The method of claim 10, wherein the instructions when executed also use the Goppa codes in a weighted Hamming metric.

12. The method of claim 11, wherein the code-based encryption scheme is a generalized (L, G) code in which a set of proper rational functions (L) over $F_2m[x]$ are chosen, wherein the denominators of L are various irreducible polynomials from $F_2m[x]$ with degree less than or equal to where r is greater than 1, and where the numerators are formal derivatives of the denominators.

13. The method of claim 8 wherein the data to be encrypted is a message vector to be securely transmitted from a sender to a receiver.

14. The method of claim 8 wherein the data when encrypted is a digital signature.

15. A method, comprising:
receiving data to be at least one of encrypted, signed, decrypted, and verified at an input device; and
providing the data to a processor for at least one of encrypting, signing, decrypting, and verifying that data using instructions from a cryptographic engine;

wherein the instructions, when executed, cause performance of at least one of the encryption, the decryption, the signature, and the verification using a code-based scheme based on a binary irreducible Goppa code in which locator polynomials for support set L of binary generalized (L, G) code are generated as irreducible polynomials with coefficients from a Galois field $GF(2^m)$ have a degree not greater than r, where r is the maximum degree of the denominator of a rational function over $F_2m[x]$, and wherein the performance causes resulting data to be protected against an attack from a quantum computer, wherein the instructions when executed further generate a private key satisfying the relationship K={S, P, L, G(x)}, wherein a parity check matrix H is generated for binary generalized Goppa code with Goppa polynomial G(x) of degree equal to t, where G(x) is an irreducible polynomial with coefficients from the field $GF(2^m)$, wherein a vector length set $N=\{n_1, n_2, \ldots, n_r\}$ of Goppa code is generated, where $n_i=I_2m(i)$, i=1, ..., r, and $n=\Sigma_{i=1}^{r} n_i$, where $I_2m(i)$ is a number of irreducible polynomials of degree i with coefficients from the field $GF(2^m)$, wherein a vector position weight set $W=\{w_1, w_2, \ldots, w_r\}$ is generated, where the first $n_1$ positions have weight $w_1=1$, the second $n_2$ positions have weight $w_2=2$, and the last $n_r$ positions have weight $w_r=r$, wherein a random mt×mt non-singular matrix S is selected, where deg G(x)=t;

wherein a random n×n permutation matrix P is selected; and wherein a public key H*=S×H×P is computed.

16. The method of claim 15, wherein the instructions when executed also use the Goppa codes in a weighted Hamming metric.

17. The method of claim 15 wherein the data to be encrypted is a message vector to be securely transmitted from a sender to a receiver.

18. The method of claim 15 wherein the data when encrypted is a digital signature.

* * * * *

UNITED STATES PATENT AND TRADEMARK OFFICE
CERTIFICATE OF CORRECTION

| | |
|---|---|
| PATENT NO. | : 11,271,715 B2 |
| APPLICATION NO. | : 16/268098 |
| DATED | : March 8, 2022 |
| INVENTOR(S) | : Sergey Bezzateev, Serguei Strakhov and Andrew Cheung |

It is certified that error appears in the above-identified patent and that said Letters Patent is hereby corrected as shown below:

On the Title Page

Item (72), replace "Sergey Strakov" with "Serguei Strakhov"

Signed and Sealed this
Fourth Day of July, 2023

Katherine Kelly Vidal
*Director of the United States Patent and Trademark Office*